US012558709B2

(12) United States Patent
Ooka

(10) Patent No.: US 12,558,709 B2
(45) Date of Patent: Feb. 24, 2026

(54) SCRAP COLLECTION DEVICE

(71) Applicant: Kioxia Corporation, Tokyo (JP)

(72) Inventor: Shinji Ooka, Yokkaichi Mie (JP)

(73) Assignee: KIOXIA CORPORATION, Tokyo (JP)

( * ) Notice: Subject to any disclaimer, the term of this patent is extended or adjusted under 35 U.S.C. 154(b) by 196 days.

(21) Appl. No.: 18/450,566

(22) Filed: Aug. 16, 2023

(65) Prior Publication Data

US 2024/0082878 A1 Mar. 14, 2024

(30) Foreign Application Priority Data

Sep. 9, 2022 (JP) ................................ 2022-143726

(51) Int. Cl.

*B07B 1/10* (2006.01)
*B07B 1/46* (2006.01)
*B07B 1/52* (2006.01)

(52) U.S. Cl.

CPC .............. *B07B 1/10* (2013.01); *B07B 1/4609* (2013.01); *B07B 1/526* (2013.01); *B07B 2230/01* (2013.01)

(58) Field of Classification Search

CPC ......... B07B 1/10; B07B 1/1609; B07B 1/526; B07B 2230/01

See application file for complete search history.

(56) References Cited

U.S. PATENT DOCUMENTS

| | | | | |
|---|---|---|---|---|
| 4,655,436 A * | 4/1987 | Williams | F27D 17/10 | 432/9 |
| 5,590,488 A * | 1/1997 | Casimaty | A01G 20/30 | 47/1.01 F |
| 5,921,399 A * | 7/1999 | Bakula | B01D 33/056 | 209/390 |
| 2008/0087580 A1* | 4/2008 | Coen | C22B 11/00 | 209/312 |
| 2014/0174628 A1* | 6/2014 | Uematsu | D04H 1/482 | 156/62.8 |
| 2015/0209830 A1* | 7/2015 | Edwards | F26B 3/08 | 209/3 |
| 2019/0060957 A1* | 2/2019 | Burukin | F04D 19/002 | |
| 2020/0270159 A1 | 8/2020 | Sugiyama et al. | | |
| 2021/0292197 A1 | 9/2021 | Sugiyama | | |

FOREIGN PATENT DOCUMENTS

| | | |
|---|---|---|
| JP | 2009-096087 A | 5/2009 |
| JP | 2020-131142 A | 8/2020 |
| JP | 2021-146418 A | 9/2021 |
| JP | 2022-089048 A | 6/2022 |

* cited by examiner

*Primary Examiner* — Michael Mccullough
*Assistant Examiner* — Kalyanavenkateshware Kumar
(74) *Attorney, Agent, or Firm* — Foley & Lardner LLP

(57) ABSTRACT

A scrap collection device according to the embodiment includes a mesh conveyor, a peeler, and one or more collection containers. The mesh conveyor includes a mesh belt configured to receive a fluid mixture of a liquid and scraps from above to trap at least a portion of the scraps and to allow the liquid to pass, and moves the mesh belt. The peeler peels the scraps from a face of the mesh belt in a state where the face of the mesh belt is directed downward. The collection containers collect the peeled scraps.

18 Claims, 3 Drawing Sheets

SCRAP COLLECTION DEVICE

CROSS-REFERENCE TO RELATED APPLICATION(S)

This application is based upon and claims the benefit of priority from Japanese Patent Application No. 2022-143726, filed Sep. 9, 2022, the entire contents of which are incorporated herein by reference.

FIELD

Embodiments described herein relate generally to a scrap collection device.

BACKGROUND

In production of semiconductors, scraps of silicon (Si) mix into treatment water, for example, during a backgrinding process. Thus, the treatment water needs to be stored in a processing apparatus in such a process. The apparatus is regularly stopped for separation of the Si scraps from the treatment water, and a worker then needs to manually remove the Si scraps from the apparatus.

Besides the backgrinding process, a technique is disclosed where, for example, a scrap collection device that is disposed in a dicing apparatus flushes on a perforated metal with a waste liquid for separation of solids from the liquid through the perforated metal to trap scraps. The perforated metal is then pushed to a position where the perforated metal hangs downward under its own weight. The perforated metal hanging downward under its own weight causes the scraps on the perforated metal to fall. A worker then removes the fallen scraps from the dicing apparatus while the apparatus is stopped.

The Si scraps may be sharp in shape and thus the worker may be injured through manual work. Such work is time-consuming, requires the apparatus to stop and thus has a drawback of high production loss.

DETAILED DESCRIPTION

Embodiments provide a device capable of discharging treatment water with Si scraps mixed therein, from a processing apparatus without stopping the processing apparatus and collecting the Si scraps in the water discharged from the processing apparatus.

In general, according to at least one embodiment, a scrap collection device includes a mesh conveyor, a peeler, and one or more collection containers. The mesh conveyor includes a mesh belt configured to receive a fluid mixture of a liquid and scraps from above to trap at least a first portion of the scraps and to allow the liquid to pass. The mesh conveyor is configured to move the mesh belt. The peeler is configured to peel the scraps from a face of the mesh belt in a state where the face of the mesh belt is directed downward. The collection containers are configured to collect the peeled scraps.

First Embodiment

Figure 1:
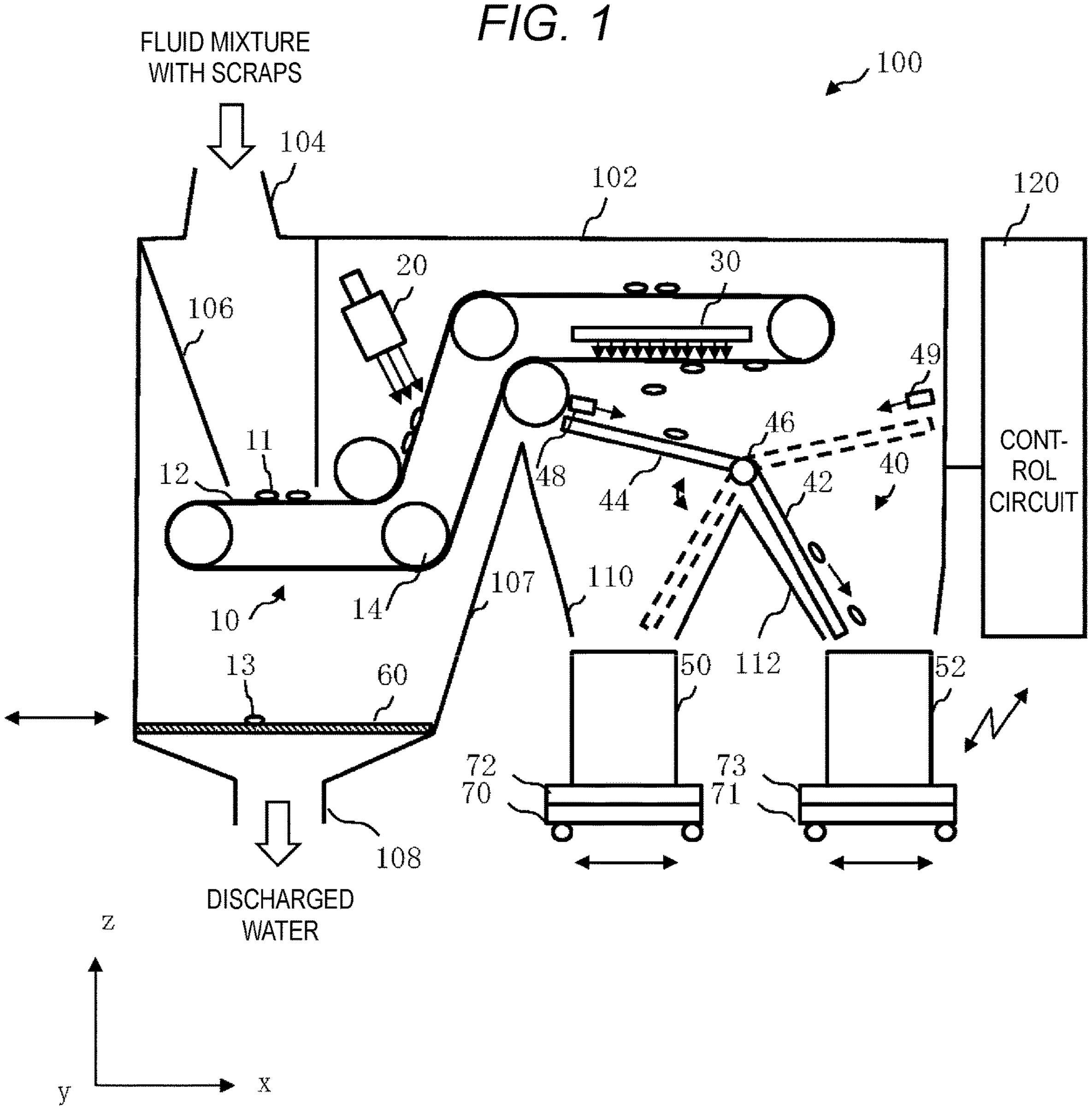
FIG. 1 is a drawing illustrating one example configuration of a scrap collection device according to a first embodiment.

FIG. 1 is a diagram illustrating one example configuration of a scrap collection device according to a first embodiment. In FIG. 1, a scrap collection device 100 includes a mesh conveyor 10, a drying mechanism (dryer) 20, a peeling mechanism 30, a sorting mechanism 40, multiple collection containers 50 and 52, and a trap 60. The mesh conveyor 10, the drying mechanism 20, the peeling mechanism 30, the sorting mechanism 40, and the trap 60 are disposed in a device enclosure 102. The device enclosure 102 has a feed port 104, a discharge port 108, a flow channel wall 106, and collection routes 110 and 112. The scrap collection device 100 is controlled by a control circuit 120. The scrap collection device 100 is disposed, for example, downstream of a processing apparatus (not shown) discharging a fluid mixture with scraps of silicon (Si). Examples of the processing apparatus include backgrinding apparatuses, polishing apparatuses, dicing apparatuses, and the like.

The mesh conveyor 10 includes a mesh belt 12 and a drive mechanism (drive) 14. The drive mechanism 14 drives the mesh belt 12. The example of FIG. 1 illustrates a case where the drive mechanism 14 rotatingly drives the mesh belt 12 clockwise.

Figure 2:
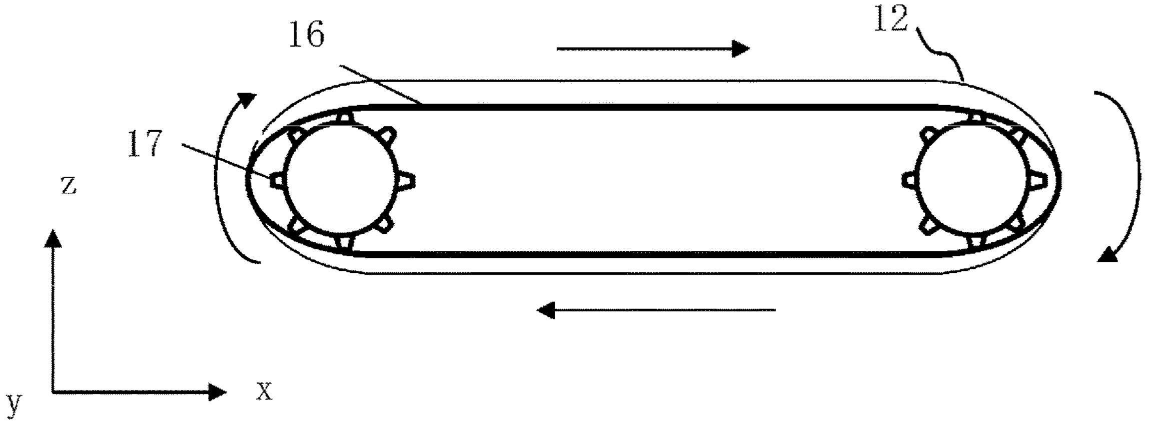
FIG. 2 is a drawing illustrating one example approach for driving a mesh conveyor according to the first embodiment.

FIG. 2 is a drawing illustrating one example approach for driving the mesh conveyor according to the first embodiment. For easy understanding of components, FIG. 2 shows the mesh belt 12, chains 16, and sprockets 17 apart from each other.

Figure 3:
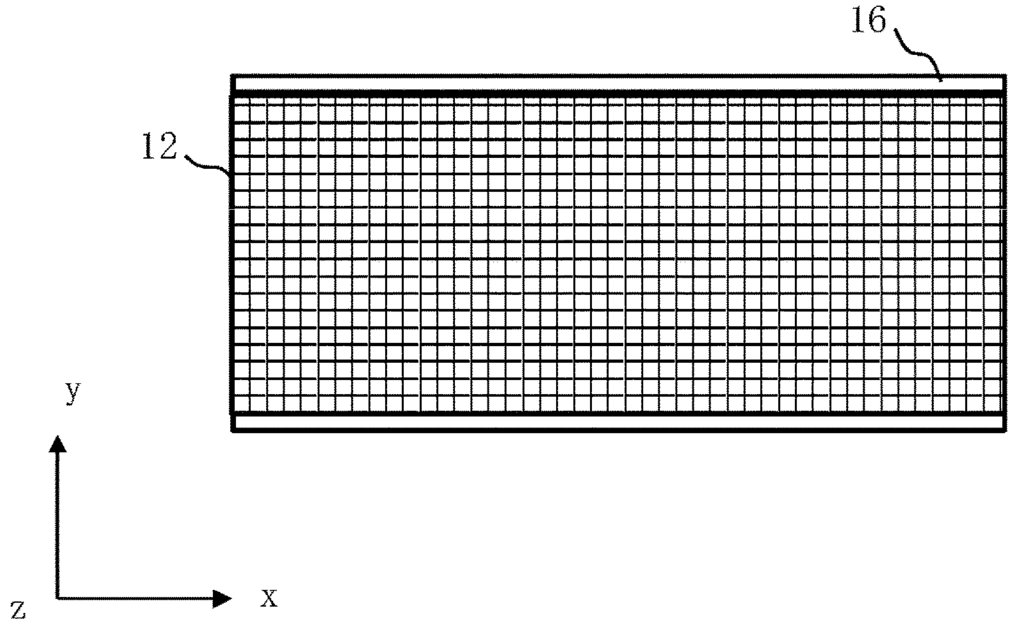
FIG. 3 is a top view of a partial mesh belt according to the first embodiment.

FIG. 3 is a top view of the partial mesh belt according to the first embodiment.

Figure 4:
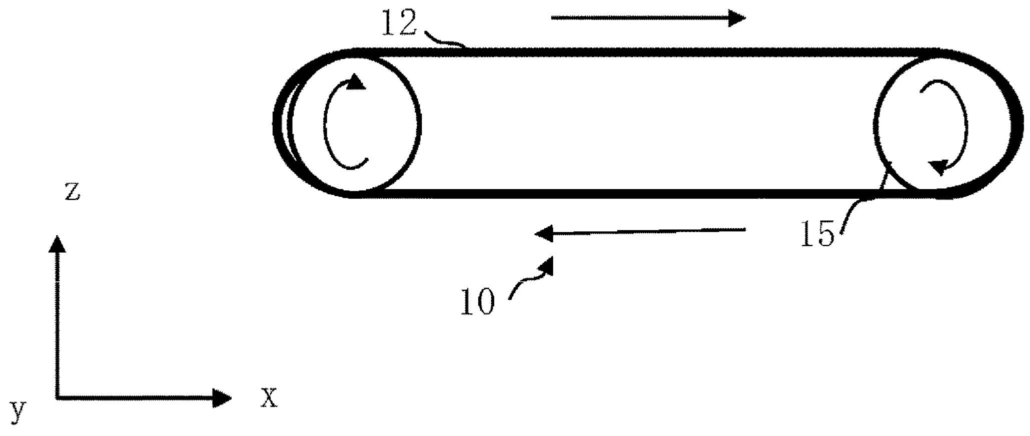
FIG. 4 is a drawing illustrating another example approach for driving the mesh conveyor according to the first embodiment.

FIG. 4 is a drawing illustrating another example approach for driving the mesh conveyor according to the first embodiment.

The mesh belt 12 is formed by braiding, for example, multiple wires of steel, such as stainless steel, for example, in a spiral manner such that meshes are formed between the steel wires. A large number of meshes (openings) are thereby arranged two-dimensionally at a predetermined pitch in the mesh belt 12. The size of the meshes may be appropriately adjusted according to the sizes of objects that are trapped. For example, the mesh size is preferably determined to be about 1 to 3 mm. The mesh belt 12 is annular in form so as to have no end in the lengthwise direction thereof. The mesh conveyor 10 moves the mesh belt 12 using the drive mechanism 14. Examples of schemes for driving the mesh conveyor 10 include chain drive schemes and roller drive schemes. The examples in FIGS. 2 and 3 illustrate one example chain drive scheme. FIG. 4 illustrates one example roller drive scheme.

In the chain drive scheme, the chains 16 are disposed at two ends of the mesh belt 12 in the widthwise direction thereof and along the mesh belt 12, as illustrated in FIG. 3. Rotation of the sprockets 17 drives the chains 16 to move the mesh belt 12 in conjunction with movement of the chains 16.

In the chain drive scheme, the chains 16 and the sprockets 17 indicate one example of the drive mechanism 14. Illustration of a motor that rotates the sprockets 17 is omitted.

In the roller drive scheme, rollers 15 are disposed under the mesh belt 12. Rotation of the rollers 15 moves the mesh belt 12. The rollers 15 indicate one example of the drive mechanism 14. Illustration of a motor that rotates the rollers 15 is omitted.

FIG. 1 illustrates a case where the upper face of the mesh belt 12 of the mesh conveyor 10 travels from the left to the right. The upper face of the mesh belt 12 horizontally moves from the left end of the conveyor and is then redirected obliquely upward at a predetermined angle. The upper face of the mesh belt 12 then horizontally moves again. The mesh belt 12 is then turned at the right end of the conveyor to horizontally move, with the upper face directed downward. The mesh belt 12 is then redirected obliquely downward. The mesh belt is then horizontally moved up to the left end of the conveyor. The mesh belt 12 is then turned at the left end of the conveyor and the upper face is directed upward. The mesh belt 12 thereafter repeats to move on the same course.

The mesh conveyor 10 receives a fluid mixture of a liquid and scraps (for example, Si scraps) 11 and 13 from above. In the example of FIG. 1, the fluid mixture is fed from the feed port 104 of the device enclosure 102. The flow channel of the fed fluid mixture is limited by the flow channel wall 106 and is fed onto the mesh belt 12. At least a portion of the scraps 11 and 13 in the fed fluid mixture is trapped by the mesh belt 12. The liquid portion of the fluid mixture then passes through the openings in the mesh belt 12. This can separate solids from the fluid mixture.

The liquid passing through the mesh belt 12 is discharged from the discharge port 108 therebelow. Above the discharge port 108, the trap 60 is disposed that includes a mesh plate in which a large number of meshes with a smaller size than those of the mesh belt 12 are formed. For example, a mesh size of about 0.5 to 0.9 mm is preferred. A mesh size small enough not to cause blockage of the discharged water is also preferred. The scraps 13 that are finer than the mesh size of the mesh belt 12 and present in the fluid mixture pass through the meshes of the mesh belt 12 together with the liquid. The trap 60 traps such fine scraps 13 escaping through the mesh belt 12.

The drying mechanism 20 dries or dewaters the scraps 11 placed on the mesh belt 12. An example of the drying mechanism 20 is an air knife, which is preferably used.

Figure 5:
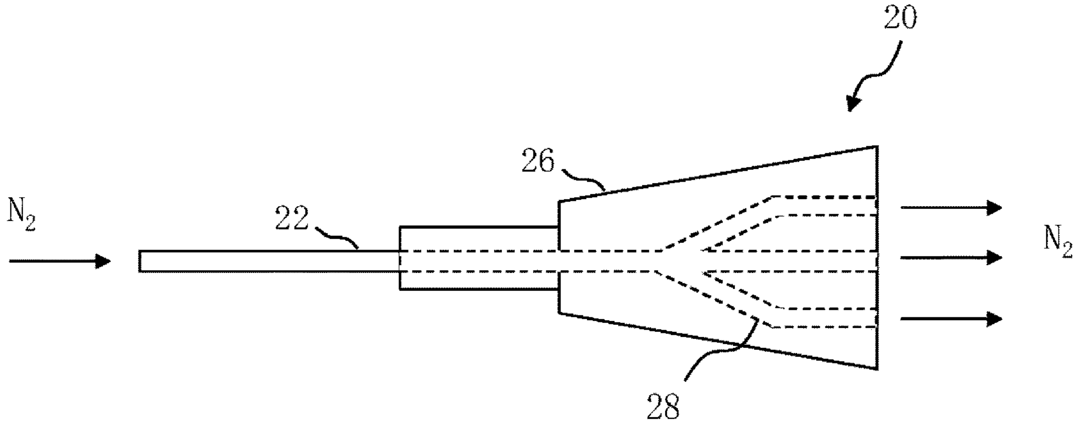
FIG. 5 is a drawing illustrating one example configuration of a drying mechanism according to the first embodiment.

FIG. 5 is a drawing illustrating one example configuration of the drying mechanism according to the first embodiment. In FIG. 5, the drying mechanism 20 includes a feed nozzle 22, a main body 26, and multiple ejection nozzles 28. The feed nozzle 22 is branched into the ejection nozzles 28 in the main body 26. A gas that is fed into the feed nozzle 22 is ejected from the ejection nozzles 28. An example of the gas is nitrogen ($N_2$), which is preferably used. Any other gas, such as air, may be used.

The drying mechanism 20 ejects the gas toward the scraps 11 placed on the face of the mesh belt 12. This causes the ejected gas to dry exposed faces of the scraps 11. Alternatively, the exposed faces of the scraps 11 are dewatered and the scraps 11 are pushed onto the mesh belt 12. This can suppress or reduce peeling of the scraps 11 from the mesh belt 12 by the gas. The liquid blown by the gas travels through the meshes of the mesh belt 12 or through an area away from the mesh belt 12 into the discharge port 108 for discharge. In order to prevent the blown liquid from entering the area of the mesh belt 12 after drying, a wall face 107 below the mesh conveyor 10 divides the bottom of the device enclosure 102 into areas corresponding to the mesh belt 12 before and after drying. For example, a portion of the blown liquid travels to the discharge port 108 along the wall face 107 for discharge.

The ejection nozzles 28 are arranged in line, for example, on the same plane. A gas can be thereby blown widely toward the scraps 11 on the moving mesh belt 12 across the width of the mesh belt 12. The scraps 11 are trapped at any position in the widthwise direction of the mesh belt 12. Arrangement of the ejection nozzles 28 in line on the same plane enables drying or dewatering of the scraps 11 regardless of the position of the upper face of the mesh belt 12. Although illustrating a case where one drying mechanism 20 is disposed, the example of the FIG. 1 is not limited thereto. Multiple drying mechanisms 20 may be disposed in the lengthwise direction of the mesh belt 12.

As illustrated in FIG. 1, the mesh conveyor 10 moves the mesh belt 12 obliquely upward, with the scraps 11 placed on the mesh belt 12. The drying mechanism 20 then blows air toward the scraps 11 placed on the face of the mesh belt 12 while the mesh belt 12 moves obliquely upward.

Figure 6:
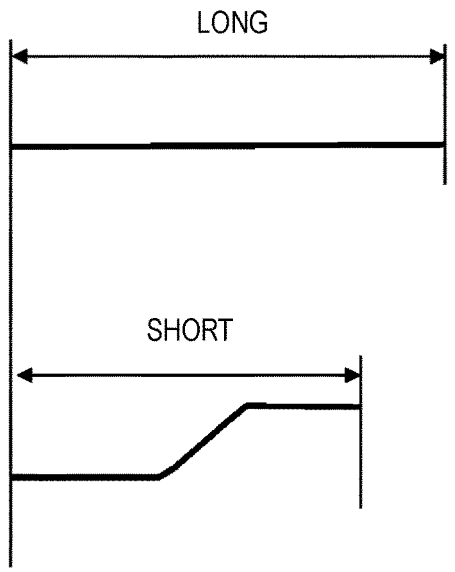
FIG. 6 is a drawing illustrating one example relation between the course of the mesh conveyor and the length of the belt in the first embodiment.

FIG. 6 is a drawing illustrating one example relation between the course of the mesh conveyor and the length of the belt in the first embodiment. As illustrated in FIG. 1, the course of the mesh conveyor 10 extends horizontally and then redirected obliquely upward. This can reduce the installation dimensions of the mesh conveyor 10 relative to the length of the mesh belt 12 for substantially upward movement of the upper face of the mesh belt 12, compared with a configuration where the mesh belt 12 horizontally moves. Thus, the installation area of the scrap collection device 100 can be reduced. In other words, in a case of drying or dewatering during the same duration of time, drying and dewatering of the scraps on the mesh belt 12 moving obliquely upward can reduce the footprint compared to drying and dewatering of the scraps on the mesh belt 12 moving horizontally, as illustrated in FIG. 6.

The dried or dewatered scraps 11 move as the mesh belt 12 moves. The mesh belt 12 is then turned at the right end of the conveyor to move, with the upper face of the mesh belt 12 directed downward. In the example of FIG. 1, the mesh belt 12 horizontally moves. Even if the upper face of the mesh belt 12 is directed downward, the scraps 11 often remain fixed on the mesh belt 12 under the influence of surface tension between the mesh belt 12 and the remaining liquid, or the like without freely falling. Thus, the peeling mechanism 30 peels the scraps 11 from the mesh belt 12, where the face, with the scraps 11 placed thereon, of the mesh belt 12 is directed downward.

Figure 7:
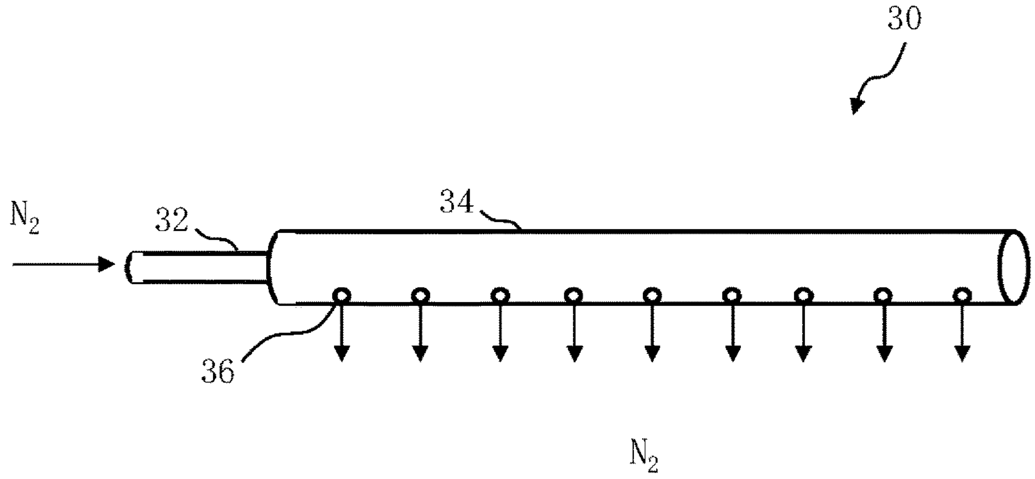
FIG. 7 is a drawing illustrating one example configuration of a peeling mechanism according to the first embodiment.

FIG. 7 is a drawing illustrating one example configuration of the peeling mechanism according to the first embodiment. In FIG. 7, the peeling mechanism 30 includes a feed nozzle 32 and a shower head 34. The shower head 34 has multiple holes 36 that are made downward. The example of FIG. 7 illustrates a case where the holes 36 are made in the shower head 34 in line. A gas fed into the feed nozzle 32 is downwardly ejected from the holes 36 made in the shower head 34. In the example of FIG. 1, the holes 36 are disposed in the lengthwise direction of the mesh belt 12. This enables sequential blowing of the gas toward the scraps 11 that are not peeled by one time of ejection to certainly peel the scraps 11. The number of peeling mechanisms 30 is not limited to one. Depending on the width size of the belt 12, multiple peeling mechanisms 30 are preferably disposed in parallel.

The peeling mechanism 30 blows the gas toward the scraps 11 through the mesh belt 12 from the backside of the face, with the scraps 11 placed thereon, of the mesh belt 12. An example of the gas is gaseous $N_2$, which is preferably used. Any other gas, such as air, may be used. The gas ejected from the shower head 34 spreads directly below and obliquely downward to reach the mesh belt 12. The gas then passes through the meshes of the mesh belt 12 to blow the scraps 11 fixed on the upper face of the mesh belt 12 and peel the scraps 11 from the mesh belt 12. The scraps 11 peeled from the mesh belt 12 fall onto the sorting mechanism 40.

The sorting mechanism 40 includes multiple doors 42 and 44 and a rotary shaft 46. More preferably, the sorting mechanism 40 further includes multiple gas ejection nozzles 48 and 49. Ends of the two doors 42 and 44 are connected at an angle that is not horizontal, with the rotary shaft 46 interposed therebetween. Below the sorting mechanism 40, the collection containers 50 and 52 are disposed.

The sorting mechanism 40 selectively sorts the peeled scraps 11 to one of the collection containers 50 and 52. Specifically, rotation of the rotary shaft 46 moves one of the doors 42 and 44 downward to allow passage of one of the collection routes 110 and 112. The other one of the doors 42 and 44 moves horizontally or upwardly rather than horizontally to block the other one of the collection routes 110 and 112.

In FIG. 1, for example, clockwise rotation of the rotary shaft 46 moves the door 42 of the doors 42 and 44 downward to allow passage of the collection route 112. At this time, the door 44 of the doors 42 and 44 moves horizontally or upwardly rather than horizontally to block the collection route 110. Thus, in such a state, the scraps 11 fallen onto the door 42 are passed onto the collection route 112 and collected in the collection container 52. The scraps 11 fallen onto the door 44 are prevented by the door 44 from intruding onto the collection route 110, slipped onto the door 44 and moved to the door 42.

When the door 44 is disposed upwardly rather than horizontally at this time, the scraps 11 slip onto the door 44 under their own weights to move to the door 42. Alternatively, the gas ejection nozzle 48 ejects the gas from the free end (exterior) of the door 44 toward the door 42 to apply the gas to the upper face of the door 44. The scraps 11 are thereby slipped onto the door 44 and moved to the door 42. When the door 44 is disposed horizontally, the gas ejection nozzle 48 ejects the gas toward the door 42. The scraps 11 are thereby slipped onto the door 44 and moved to the door 42.

In FIG. 1, for example, counterclockwise rotation of the rotary shaft 46 moves the door 44 of the doors 42 and 44 downward and allows passage of the collection route 110. At this time, the door 42 of the doors 42 and 44 moves horizontally or upwardly rather than horizontally to block the collection route 112. Thus, in such a state, the scraps 11 fallen onto the door 44 are passed onto the collection route 110 and collected in the collection container 50. The scraps 11 fallen onto the door 42 are prevented by the door 42 from intruding onto the collection route 112, slipped onto the door 42 and moved to the door 44.

When the door 42 is disposed upwardly rather than horizontally at this time, the scraps 11 slip onto the door 42 under their own weights to move to the door 44. Alternatively, the gas ejection nozzle 49 ejects the gas from the free end (exterior) of the door 42 toward the door 44 to apply the gas to the upper face of the door 42. The scraps 11 are thereby slipped onto the door 42 and moved to the door 44. When the door 42 is disposed horizontally, the gas ejection nozzle 49 ejects the gas toward the door 44. The scraps 11 are thereby slipped onto the door 42 and moved to the door 44.

The collection containers 50 and 52 collect the peeled scraps 11. Since the sorting mechanism 40 limits the collection route to one of the collection routes 110 and 112, the collection container 52 does not collect the scraps 11 while the collection container 50 collects the scraps 11. Conversely, the collection container 50 does not collect the scraps 11 while the collection container 52 collects the scraps 11.

The collection container 50 is placed onto a weight sensor 72 for measurement of the weight. Similarly, the collection container 52 is placed onto a weight sensor 73 for measurement of the weight. In a case, for example, where the collection container 50 collects the scraps 11, the sorting mechanism 40 blocks the collection route 110 and opens the collection route 112 when the weight of the collection container 50 reaches a defined quantity. The collection container 52 then starts collection of the scraps 11. While the collection container 52 collects the scraps 11, a worker moves the collection container 50 and replaces it with another collection container. The scraps 11 stored in the collection container 50 are moved and then discarded. Alternatively, while the collection container 52 collects the scraps 11, the worker moves the collection container 50, discards the scraps 11 therein and then moves the collection container 50 to the original position. The collection container 50 is thereby emptied again. For example, the collection container 50 is placed on a dolly 70 with the weight sensor 72 mounted thereon. Thus, the worker can replace the collection container 50 by moving the dolly 70. Hence, the workability can be enhanced.

Subsequently, when the weight of the collection container 52 reaches a defined quantity, the sorting mechanism 40 blocks the collection route 112 and opens the collection route 110. The replaced and emptied collection container 50 then starts collection of the scraps 11. While the collection container 50 collects the scraps 11, the worker moves and replaces the collection container 52 with another collection container. The scraps 11 stored in the collection container 52 are moved and then discarded. Alternatively, while the collection container 50 collects the scraps 11, the worker moves the collection container 52, discards the scraps 11 therein and then moves the collection container 52 to the original position. The collection container 52 is thereby emptied again. For example, the collection container 52 is placed on a dolly 71 with the weight sensor 73 mounted thereon. Thus, the worker can replace the collection container 52 by moving the dolly 71. Hence, the workability can be enhanced.

Repetition of such operations allows continuous collection of the scraps 11. Thus, the upstream processing apparatus need not be stopped and hence the workability can be enhanced. Furthermore, the scraps 11 are automatically separated and collected in the scrap collection device 100, which can preclude the worker from handling the scraps 11. Thus, the safety can be enhanced in comparison with the related art.

Since the quantity of the fine scraps 13 trapped by the trap 60 is quite small, the maintenance of the trap 60 can be less frequent than the exchange of the collection containers 50 and 52. In case of the maintenance of the trap 60, the trap 60 can be horizontally moved and removed from the device. The removed trap 60 can be then turned upside down. The trapped scraps 13 can be thereby dropped for disposal. The trap 60 may be also kept upside down and air may be ejected from the backside. This can also preclude the worker from directly handling the scraps 13.

As described above, according to the first embodiment, the treatment water with Si scraps therein can be discharged from the processing apparatus and the Si scraps in the water discharged from the processing apparatus can be collected without stopping the processing apparatus.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A scrap collection device comprising:

a mesh conveyor including a mesh belt configured to receive a fluid mixture of a liquid and scraps from above to trap at least a first portion of the scraps and to allow the liquid to pass, the mesh conveyor being configured to move the mesh belt;

a peeler configured to peel the scraps from a face of the mesh belt in a state where the face is directed downward;

one or more collection containers configured to collect the peeled scraps; and a sorter configured to selectively sort the peeled scraps to one of multiple collection containers of the one or more collection containers;

wherein the sorter includes multiple doors connected at a non-horizontal angle via a rotary shaft.

2. The scrap collection device according to claim 1, wherein the mesh conveyor further includes a drive configured to rotate chains disposed at two ends of the mesh belt in a widthwise direction of the mesh belt.

3. The scrap collection device according to claim 1, wherein the mesh conveyor further includes a drive configured to move the mesh belt extending over multiple rollers by rotating the rollers.

4. The scrap collection device according to claim 1, wherein the doors are configured to be rotated by the rotary shaft such that a first door of the doors prevents the peeled scraps from intruding into a first collection container of the collection containers.

5. The scrap collection device according to claim 4, further comprising a first gas ejector configured to move the scraps from the first door of the doors to a second door of the doors, the first door preventing intrusion of the scraps.

6. The scrap collection device according to claim 4, wherein the doors are further configured to be rotated by the rotary shaft such that a second door of the doors prevents the peeled scraps from intruding into a second collection container of the collection containers.

7. The scrap collection device according to claim 6, further comprising a second gas ejector configured to move the scraps from the second door to the first door, the second door preventing intrusion of the scraps.

8. The scrap collection device according to claim 1, wherein the peeler is configured to blow a gas toward the scraps through the mesh belt from a backside of the face of the mesh belt, the scraps being placed on the face.

9. The scrap collection device according to claim 8, wherein the peeler includes multiple gas blowing holes arranged along a lengthwise direction of the mesh belt.

10. The scrap collection device according to claim 1, further comprising a dryer configured to dry the scraps placed on the mesh belt.

11. The scrap collection device according to claim 10, wherein the mesh conveyor is configured to move the mesh belt obliquely upward, with the scraps placed on the mesh belt, and the dryer is configured to blow a gas toward the scraps placed on the face of the mesh belt while the mesh belt is moved obliquely upward.

12. The scrap collection device according to claim 11, wherein the dryer includes multiple gas blowing holes arranged along a widthwise direction of the mesh belt.

13. The scrap collection device according to claim 1, further comprising a trap configured to trap a second portion of the scraps passing through the mesh belt together with the liquid.

14. The scrap collection device according to claim 13, further comprising a discharge port below a position of the mesh belt, the discharge port being configured to receive the fluid mixture from above, wherein the trap is disposed between the position of the mesh belt and the discharge port.

15. The scrap collection device according to claim 13, wherein the trap includes a mesh plate, multiple meshes being formed in the mesh plate, the meshes of the mesh plate having a smaller size than meshes of the mesh belt.

16. The scrap collection device according to claim 1, further comprising sensors configured to measure respective weights of multiple collection containers of the one or more collection containers collecting the peeled scraps.

17. A method for collecting scraps, comprising:

feeding a fluid mixture of a liquid and the scraps to a rotating mesh belt at a first position from above to trap at least a portion of the scraps on the mesh belt;

peeling the scraps trapped on the rotating mesh belt at a second position where a face of the mesh belt is directed downward and the scraps are placed on the face;

sorting selectively the peeled scraps to one of a plurality of collection containers using a sorter, the sorter including multiple doors connected at a non-horizontal angle via a rotary shaft; and collecting the scraps in one of the plurality of collection containers disposed below the mesh belt.

18. The method for collecting scraps according to claim 17, further comprising passing the liquid of the fluid mixture through the mesh belt at the first position downwardly for separation of at least the portion of the scraps from the liquid.

* * * * *